(12) United States Patent
Pickering et al.

(10) Patent No.: US 6,738,457 B1
(45) Date of Patent: May 18, 2004

(54) VOICE PROCESSING SYSTEM

(75) Inventors: John Brian Pickering, Winchester (GB); Graham Hugh Tuttle, Southhampton (GB)

(73) Assignee: International Business Machines Corporation, Armonk, NY (US)

( * ) Notice: Subject to any disclaimer, the term of this patent is extended or adjusted under 35 U.S.C. 154(b) by 658 days.

(21) Appl. No.: 09/593,054

(22) Filed: Jun. 13, 2000

(30) Foreign Application Priority Data

Oct. 27, 1999 (GB) .............................................. 9925297

(51) Int. Cl.[7] .............................................. H04M 1/64
(52) U.S. Cl. ................................ 379/88.16; 379/88.22; 704/258
(58) Field of Search ................................ 704/258, 261, 704/266, 269, 270, 271, 272, 278; 379/67.1, 88.16, 88.22

(56) References Cited

U.S. PATENT DOCUMENTS

| | | | | |
|---|---|---|---|---|
| 4,823,380 A | * | 4/1989 | Kohen et al. | 379/387.02 |
| 5,278,943 A | * | 1/1994 | Gasper et al. | 704/200 |
| 5,704,007 A | * | 12/1997 | Cecys | 704/260 |
| 5,750,912 A | * | 5/1998 | Matsumoto | 84/609 |
| 5,860,064 A | * | 1/1999 | Henton | 704/260 |
| 5,864,812 A | * | 1/1999 | Kamai et al. | 704/268 |
| 5,889,223 A | * | 3/1999 | Matsumoto | 84/609 |
| 5,890,115 A | * | 3/1999 | Cole | 704/258 |
| 5,895,449 A | * | 4/1999 | Nakajima et al. | 704/278 |
| 5,930,755 A | * | 7/1999 | Cecys | 704/260 |
| 5,963,907 A | * | 10/1999 | Matsumoto | 704/270 |
| 6,148,175 A | * | 11/2000 | Freedland | 455/3.06 |
| 6,216,104 B1 | * | 4/2001 | Moshfeghi et al. | 704/260 |
| 6,266,418 B1 | * | 7/2001 | Carter et al. | 380/257 |
| 6,304,846 B1 | * | 10/2001 | George et al. | 704/270 |
| 6,317,486 B1 | * | 11/2001 | Hollins et al. | 379/88.23 |

FOREIGN PATENT DOCUMENTS

FR 2830718 A1 * 4/2003 ............ H04R/3/00

OTHER PUBLICATIONS

"Auditory Vowel Formant Variability", PhD Thesis, Pickering JB, University of Oxford, 1986, chapter 6 plus drawings.
"Vowel Perception and Production" by Rosner and Pickering, Oxford University Press, 1994, Chapter 5.

* cited by examiner

*Primary Examiner*—Scott L. Weaver
(74) *Attorney, Agent, or Firm*—Carstens, Yee & Cahoon, LLP; A. Bruce Clay

(57) ABSTRACT

A voice processing system 10 is connected to the telephone network 110, and runs one or more applications 220 for controlling interaction with calls to or from the telephone network. The system records audio segments by first and second speakers, and extracts the vocal characteristics of each speaker. Then, when an audio segment recorded by the first speaker is played back, the system can apply to it the vocal characteristics of the second speaker, thereby making it sound as if the second speaker had recorded the segment.

16 Claims, 4 Drawing Sheets

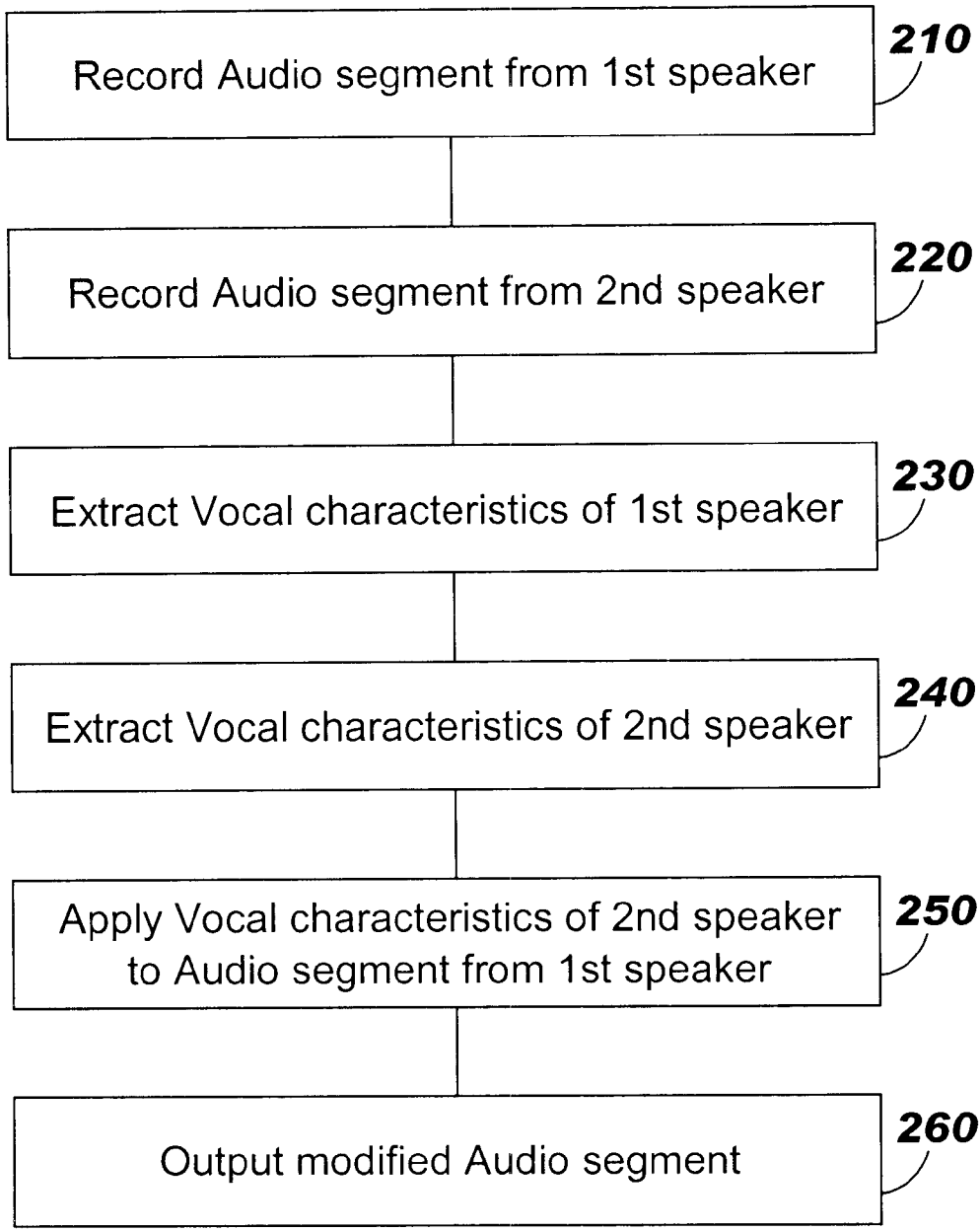

VOICE PROCESSING SYSTEM

BACKGROUND OF THE INVENTION

1. Field of the Invention

The present invention relates to voice processing systems and such like, and in particular to the way in which such systems can interact with callers.

2. Description of the Related Art

Voice processing systems whereby callers interact over the telephone network with computerised equipment are very well-known in the art, and include voice mail systems, voice response units, and so on. Typically such systems ask a caller (or called party) questions using prerecorded prompts, and the caller inputs answers by pressing dual tone multiple frequency (DTMF) keys on their telephone. In this manner, the caller can navigate through a hierarchy of prompt menus, for example to retrieve desired information, or to be connected eventually to a particular telephone extension or customer department.

There has been an increasing tendency in recent years for voice processing systems to use speech recognition (also sometimes called voice recognition—the two terms are used interchangeably herein), in order to augment DTMF input. The adoption of speech recognition permits the handling of callers who do not have a DTMF phone, and also the acquisition of more complex information beyond simple numerals from the caller. Speech recognition in a telephony environment can be supported by a variety of hardware architectures. Many voice processing systems include a special DSP card for running speech recognition software (firmware or microcode), which is connected to a line interface unit for the transfer of telephony data via a time division multiplex (TDM) bus. Most commercial voice processing systems conform to one of two standard TDM bus architectures: either the Signal Computing System Architecture (SCSA), or the Multi-vendor Integration Protocol (MVIP). A somewhat different configuration is described in GB 2280820, in which a voice processing system is connected via a local area network to a remote server, which provides a voice recognition facility.

Voice processing systems such as interactive voice response systems (IVRs) run applications to play prerecorded prompts to callers. IVRs typically have a set of system provided audio segments for commonly used items, such as numbers, days of the week, and so on. Additional audio segments must then be recorded as required for any specific application. The prompts played to a caller for that application can then be formed from one or more system provided audio segments and/or one or more application specific audio segments, concatenated together as required.

One problem with this approach is that the voice used to record the application specific audio segments will generally sound different from the voice which was used to record the system provided audio segments. Therefore the output when a system provided audio segment is concatenated with an application specific prompt will sound slightly incongruous. One way around this difficulty is to have the person who records the application specific audio segments re-record the system provided audio segments, so that all are spoken with the same voice. However, the extra time for these re-recordings represents additional expense for the application developer, and the possible duplication of recorded audio segments can increase system storage requirements. These problems are particularly acute where the IVR is running two or more applications, if it is decided to re-record the system prompts separately for each application.

A similar problem is related specifically to voice mail systems (also termed voice messaging systems), which are used to store messages from incoming calls when the intended recipient is absent or otherwise engaged. The intended recipient (often referred to as a subscriber to the voice mail system) can then listen to their stored messages at some future time. A voice mail system is generally implemented either on special purpose computer hardware, or else on a standard computer workstation equipped with a suitable telephony interface. This system is then attached to (or into) the telephone network, typically via a switch or PBX. Such voice mail systems are well-known; one example is the DirectTalkMail system, available from IBM Corporation (now marketed as the IBM Message Center). Other examples of voice mail systems are described in U.S. Pat. No. 4,811,381 and EPA 0588576.

An important feature of many voice mail systems is their ability to provide callers with a personalized greeting for the intended recipient, for example: "The party you have called, JOHN SMITH, is unavailable at present. Please leave a message after the tone, or hit the zero key for further assistance". This greeting actually comprises three (or more) audio segments which the system automatically concatenates together for audio output:

(1) "The party you have called"
(2) "JOHN SMITH"
(3) "is unavailable at present. Please leave a message after the tone, or hit the zero key for further assistance".

In this case the first and last segments may be standard audio segments provided by the voice mail system. By contrast, the middle segment (sometimes referred to as the "audio name") is a separate audio segment which has to be specifically recorded by the subscriber. This is because it is very difficult to generate a spoken name automatically, for example with a text to speech system, because of the very wide range of names (many with unusual spellings), and also because of the variety of pronunciations used by different people even when they have the same name.

The use of such personalized greetings is further beneficial in voice mail systems, because hearing the name and indeed recorded voice of the subscriber reassures the caller that they have reached the correct mailbox. Nevertheless, the overall output can sound somewhat awkward in that the system provided audio segments (ie segments (1) and (3) above) may be spoken in a very different voice to that of the subscriber. This can then sound very cumbersome when they are concatenated together with the audio name of the subscriber.

The way to try to overcome this problem is to have the subscriber record the entire greeting, in other words, to record all three segments above (possibly as one long segment). Although this removes any disparity in sound between the different parts of the greeting, it is still not entirely satisfactory. For example, not all subscribers may be prepared for the additional effort required to produce the longer recording. This is particularly the case where the system may provide different greetings for different situations (eg one for general unavailability, one for when the subscriber has left the office for the night, etc), and where the system can normally re-use the same audio name recording for the different greetings. Therefore, if it is desired to have a greeting spoken in its entirety by a subscriber, then the subscribers may now be faced with having to record multiple greetings, rather than just a single audio name. Furthermore, even those subscribers that are prepared to record whole greetings may produce a greeting that is mumbled and difficult to understand, hesitant, lacks information, or has some other defect compared to the standard system audio segments. This in turn can reflect badly on the professionalism of the subscriber's organization.

SUMMARY OF THE INVENTION

Accordingly, the invention provides a voice processing system for connection to a telephone network and running at least one application for controlling interaction with calls over the telephone network, said system comprising:

means for providing at least one audio segment recorded by a first speaker for use by said at least one application;

means for providing at least one vocal parameter characteristic of a second speaker;

means for applying said at least one vocal parameter to said audio segment to produce a modified audio segment such that said modified audio segment sounds substantially as if spoken by said second speaker; and means for outputting the modified audio segment over the telephone network.

Thus the invention allows audio segments to be modified to sound as if spoken by a different person from the person who originally recorded the segment. This has many possible applications in a voice processing environment, for example where an audio output comprises two or more segments, including at least one recorded by the first speaker and at least one recorded by the second speaker. Thus each audio segment recorded by the first speaker can be modified such that the audio output sounds substantially as if all spoken by said second speaker. This facility could be used (amongst other possibilities) in a voice messaging system, where an audio name recorded by a subscriber is embedded into one or more system prompts (ie normalization of the audio name to the carrier segment or segments).

A slightly different possibility is where an application uses multiple audio segments. Each of said multiple audio segments may be modified such that the audio output sounds substantially as if all segments are spoken by said second speaker. This is useful where for example it is desired to update an application with new prompts, whilst still retaining some of the old prompts (or perhaps using some system provided prompts) and the person who recorded the old prompts or system prompts is no longer available to make the new recordings.

In the preferred embodiment, the system further comprises means for providing at least one vocal parameter characteristic of the first speaker. The modified audio segment can then be produced by altering at least one instantaneous vocal parameter of the segment, dependent on an average value of said vocal parameter for the second speaker relative to an average value of said vocal parameter for the first speaker.

It will be appreciated that the average vocal parameters of the first and second speakers can be determined in advance, perhaps on different machines, and made available for subsequent use. The average parameters for the first speaker may be derived directly from the audio segment to be modified, or from some other recording by that speaker. The instantaneous vocal parameters for the segment will then be typically determined and modified on the fly as part of the audio output process.

In the preferred embodiment the vocal parameters characteristic of the first and second speakers comprise for each respective speaker the average value of the frequency of at least two formats, a measure of the degree of distribution of the two format frequencies about their respective average values, the variation of the format bandwidth with format frequency, and fundamental frequency. It has generally been found to be most effective to use four formats for specifying the vocal parameters; (a lower number can reduce speaker discrimination, whilst a higher number does relatively little to improve it). Note however that the principle of the invention is not restricted to use of formats for vocal parameters, but could be adopted with any suitable mathematical characterization of the vocal tract. (NB as will be appreciated by the skilled person, formats represent peaks in the frequency response of the human vocal tract).

In accordance with the invention, an appropriate algorithm is provided for the modification of each of the above vocal parameters from a value characteristic of a first speaker to one characteristic of a second speaker. For example, an instantaneous fundamental frequency of an audio segment to be modified is altered from an original value to a new value, such that the displacement of the new value from the average value of said fundamental frequency as spoken by the second speaker is equal to the displacement of the original value from the average value of said fundamental frequency as spoken by the first speaker, scaled by the ratio of the respective average fundamental frequencies for said first and second speakers.

In the preferred embodiment, the audio segments are stored in compressed form using linear predictive coding (LPC), a well-known form of voice signal encoding. The transformation of vocal characteristics can be applied directly to stored audio data (ie without any need for decompression/compression). Indeed it is particularly straightforward to derive the necessary vocal parameters and perform the desired modifications directly on LPC data. This transformation could therefore be added performed by a preprocessor to a standard LPC decoder on-the-fly at decode time, or alternatively, it may be desired to separate the transformation from the decoding, perhaps updating a whole library of audio segments effectively in batch mode for output at some arbitrary time in the future.

Conceptually the reason why the invention is accommodated relatively easily using LPC is that this coding method effectively separates out an audio signal into an excitation source (ie the vocal chords) and a filter function (ie the vocal tract). The application of the vocal parameters to an audio segment recorded by a first speaker to produce a modified audio segment such that said modified audio segment sounds substantially as if spoken by a second speaker can then be performed by replacing the excitation source and filter function of the first speaker by the excitation source and filter function of the second speaker.

It will be appreciated of course that the same general approach (modeling and replacement of excitation source and filter function) can be employed even if LPC is not used (LPC is based upon an all-pole filter function, but other filter types may be used). The invention may also be employed with other coding schemes apart from LPC, for example those used for Internet telephony, where the voice processing system is connected to the Internet or other TCP/IP based network. Note that in such environments, the voice information is generally transmitted over the network in compressed format.

The invention further provides a method for modifying audio output from a voice processing system running at least one application for controlling interaction with calls over a telephone network, said system comprising:

providing at least one audio segment recorded by a first speaker for use by said at least one application and at least one vocal parameter characteristic of a second speaker;

applying said at least one vocal parameter to said audio segment to produce a modified audio segment such that said modified audio segment sounds substantially as if spoken by said second speaker; and outputting the modified audio segment over the telephone network.

The invention further provides apparatus for running an application which plays out audio segments, said apparatus comprising:

means for providing a set of audio segments recorded by a first speaker for use by said application;

means for providing at least one vocal parameter characteristic of a second speaker;

means for applying said at least one vocal parameter to said set of audio segments to produce a modified set of audio segments such that said modified set of audio segments sounds substantially as if spoken by said second speaker; and means for outputting the set of modified audio segments.

The invention further provides a method for updating an application which plays out a set of audio segments recorded by a first speaker, comprising:

providing at least one vocal parameter characteristic of a second speaker;

applying said at least one vocal parameter to said set of audio segments to produce a modified set of audio segments such that said modified set of audio segments sounds substantially as if spoken by said second speaker; and outputting the set of modified audio segments.

BRIEF DESCRIPTION OF THE DRAWINGS

A preferred embodiment of the present invention will now be described in detail by way of example only with reference to the following drawings:

FIG. 2 illustrates a method practiced on the voice processing system of FIG. 1 to make an audio segment recorded by one speaker sound as if spoken by a second speaker;

FIG. 3b schematically illustrates the output of the excitation source of FIG. 3a;

DETAILED DESCRIPTION

Figure 1:
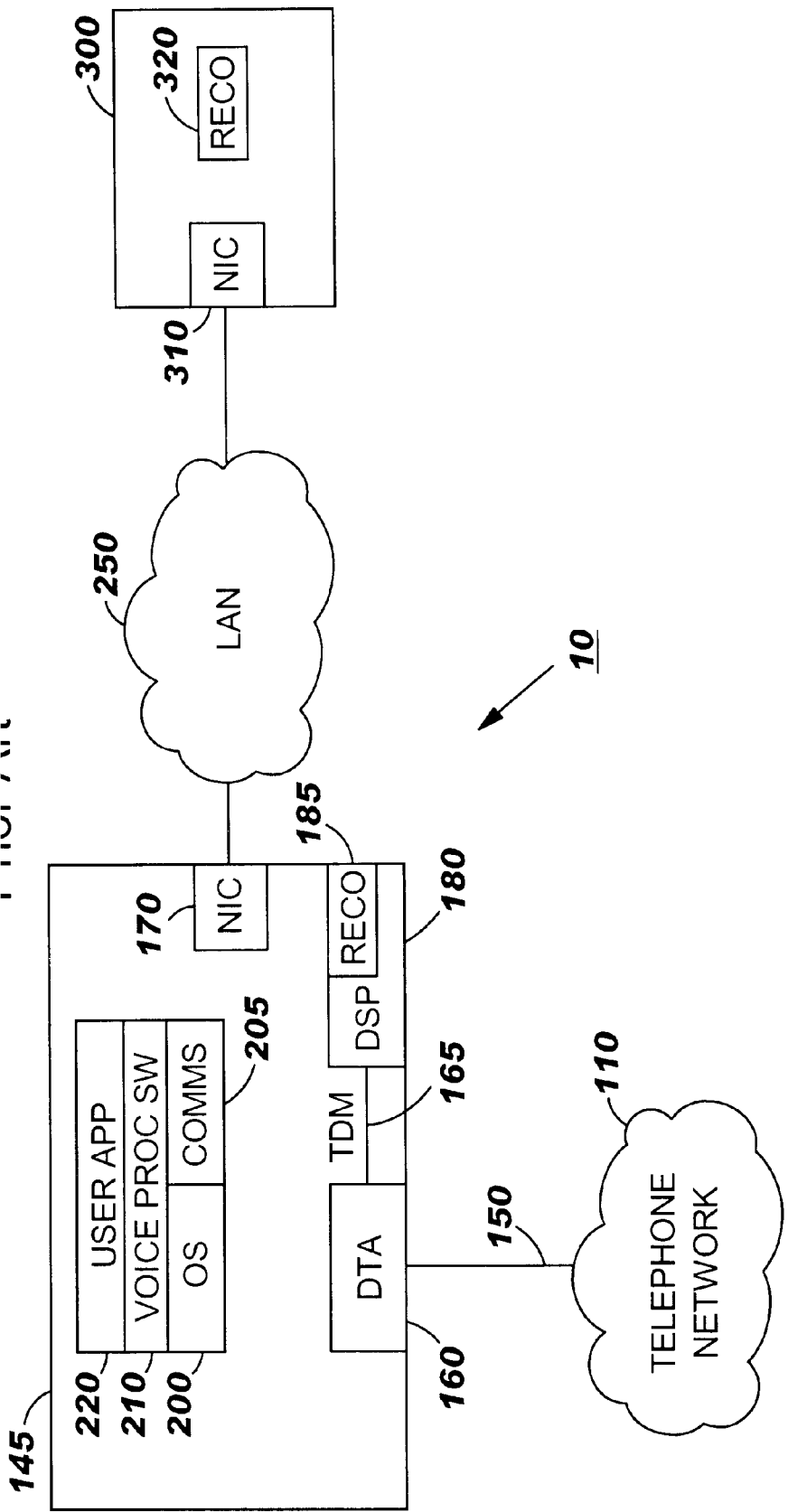
FIG. 1 depicts a voice processing system.

FIG. 1 illustrates in simplified schematic form the main hardware and software components of a voice processing system 10. The system 10 is connected to the telephone network 110 by one or more digital trunk lines 150, each carrying multiple telephony channels (T1 digital trunk lines in North America comprise 24 channels, E1 digital trunk lines in Europe comprise 30 channels). It will be appreciated that in some installations, the digital trunk lines may be connected to the telephone network 110 via a switch or PBX (not shown); one other possibility is for the voice processing system to be effectively a part of the telephone network itself, providing intelligent services to the network.

The system unit 145 of the voice processing system comprises a computer workstation, which runs an appropriate operating system 200 and a voice processing program 210, which in turn interacts with a user application 220 in order to determine how calls should be processed. The system unit includes one or more digital trunk adapter cards 160 for interfacing to the telephone network 110 via link 150. The system unit also contains a network interface card 170 which allows programs running on the workstation to communicate over a local area network (LAN) 250, using communications software 205 incorporated into the operating system. In addition, the system unit includes a digital signal processing (DSP) card 180, which is connected to the trunk adapter (or adapters) via a time division multiplex (TDM) bus 165. Speech recognition software 185 may be installed on the DSP card.

The adapter card (or cards) 160 is responsible for interfacing with the telephone network over respective lines, including signaling, demultiplexing incoming telephony signals, and so on. It may also be used to perform activities such as voice activity detection on a particular telephony channel, compression/decompression of voice signals, and DTMF recognition and generation, although these may be performed on the DSP card instead.

A server system 300 is attached to the LAN 250 via network interface card 310, and supports an operating system and appropriate communications software (not shown), and speech recognition software 320. It will be appreciated therefore that there are two voice recognition resources available to the application 220, the first of these being locally installed on the DSP card 180 in the system unit, and the second voice recognition resource being available remotely via the LAN 250 on server 300.

In some embodiments an additional link (not shown) may be provided into the voice processing system, typically from a switch (or PBX), in order to exchange additional signaling information between the switch and the voice mail system. For example, if the switch transfers a call from an internal extension to the voice mail system, it can use this link to inform the voice mail system of the internal extension to which the call was originally directed. This allows the voice mail system to play the greeting for the subscriber who owns that internal extension. Alternatively, it is possible to provide some of this signaling information over the digital trunk line(s) 150.

In one preferred embodiment, the voice processing system is the Corepoint voice response unit (previously known as the DirectTalk voice processing system) available from IBM Corporation, running on an RS/6000 workstation on top of the AIX operating system. The TDM bus comprises an SCbus, and the DSP card comprises an Antares card, both available from Dialogic Corporation, New Jersey, USA. In order to provide a voice messaging service, the DirectTalk-Mail program, also available from IBM Corporation, may be installed as an application which runs on top of the Direct-Talk voice processing program. This contains routines to allow callers to telephone messages into the system and to allow subscribers to subsequently extract these messages for listening to. Further details about the DirectTalkMail program can be found in the manual "DirectTalkMail for AIX: General Information and Planning, version 2", 1999, reference GC34-5521-01, and the additional manuals referenced therein.

It will be appreciated that there are many possible variations in the design of the voice processing system of FIG. 1.

For example, some voice processing systems accept input from analog lines rather than digital trunks, whilst some voice processing systems package the DSP card 185 as a daughter card of the DTA 160, thereby eliminating the need for the TDM bus. The illustrated system also has access to both a server voice recognition system, and also to a local DSP recognition system, whereas many voice processing systems will have access to only one such resource. Further, any suitable network could be used for communications between the server and the voice processing system, providing it has suitable transmission characteristics in terms of bandwidth and latency (eg one possibility might be to use an ATM connection). In addition, although the voice processing system illustrated has just a single local DSP resource, some voice processing systems may include multiple DSP cards, with each card supporting multiple recognition programs running simultaneously. Moreover, although the server approach as shown has the recognition system installed on a separate machine from the line interface unit 160, it would clearly be possible for the software recognition system to be running on the same machine 145 as the line interface unit, provided this machine had sufficient processing capability. Another variation that is increasingly common is that the voice processing system is connected to callers over the Internet using voice over IP (either instead of or in addition to connections over the conventional telephone network). The skilled person will appreciate that such variations are not pertinent to the principles of the present invention.

A typical operation of the voice processing system of FIG. 1 is as follows. An incoming call is received over the telephony network 110, and the voice processing system 10 associates the call with a particular user application 220, for example based on the called or calling number (ie DNIS= dialed number identification service, or ANI=automatic number identification, respectively). This may result in the call on a given channel on the trunk adapter 160 being connected with a channel on the DSP card 180 via the TDM bus 165, thereby providing access to any desired signal processing resource. Access to the remote resource 300 can be achieved for example using the approach described in GB 2325110, which is incorporated herein by reference. (Note that the TDM bus connection as shown in FIG. 1 provides a uni-directional data flow, so that as is well-known in the art, a pair of such connections are needed to support a full duplex telephone conversation).

The user application processes the call in accordance with the user input and any other pertinent information, such as time of day, geographical origin of call, and so on. For example, if the caller has entered a numerical sequence corresponding to an account number, the system may then play out to the caller information such as the balance of the account; if the caller has spoken a particular name, the system may transfer the caller to the voice messaging service for that name.

In the situation where the voice processing system of FIG. 1 is configured as a voice messaging system, the DirectTalkMail system acts as a form of database system, based on mailboxes. Thus each user or subscriber has a mailbox, which has associated with it a user profile which includes all the information for that user, eg their extension number, their password, the number of new messages that they have, their current greeting, and so on. The mailbox also logically contains the digitized stored messages for that subscriber (although physically the audio recording may be stored in a different location from the other information). Each mailbox has a unique identifier, such as a number or name; in the preferred embodiment, each mailbox is allocated the extension number of the subscriber associated with that mailbox.

Audio messages are typically stored in compressed format in order to best utilize the storage capacity of the system. Indeed, this is generally true of all recorded audio segments stored in a voice processing system, although some particular segments may be stored in uncompressed format so as to maximize audio quality. The DirectTalkMail system uses a highly efficient form of compression based on linear predictive coding (LPC), which is widely used for compressing audio signals—for example, the GSM standard used for compressing mobile telephone signals is a form of LPC. Obviously the audio segments and messages are decompressed for play-back.

As previously stated, in prior art voice messaging systems the personalized greeting for a subscriber may often comprise the audio name for that subscriber (ie the name of the subscriber as spoken by the subscriber) combined with one or more system-provided audio segments. Since the system-provided audio segments are not recorded by the same voice as the audio name, the overall effect of combining the two can sometimes sound incongruous.

The underlying method for overcoming the above problem in accordance with the present invention is illustrated schematically in FIG. 2, which shows the recording of audio segments by first and second speakers (steps 210 and 220), corresponding for example to the system-provided audio segments and audio name respectively. Next, the vocal characteristics of the relevant speaker are extracted from each recording (steps 230 and 240). Details of how this extraction is performed are given below. It will be appreciated that so far the processing of the first recording (ie steps 210 and 230) is essentially independent of the processing of the second recording (ie steps 220 and 240). In other words, the pair of steps associated with the first recording may be performed before or after the pair of steps associated with the second recording. Furthermore, the processing of the first and second recordings can be performed potentially on different machines.

The key step (step 250) is then that the vocal characteristics from one speaker (eg the second speaker) are applied to a recording made by the other speaker (eg the first speaker), with the consequence that recording is modified to sound as if actually spoken by the other speaker (ie in this example, the second speaker). Again, the mechanism for doing this is described in more detail below. Finally, the modified recording can be played out (step 260).

Figure 3A:
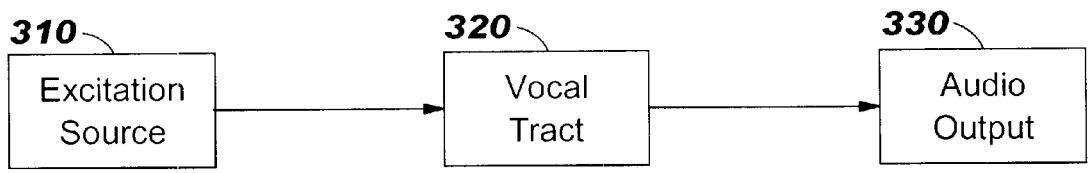
FIG. 3a schematically illustrates a model for the output of an audio signal in speech.

In the preferred embodiment, the vocal characteristics that are extracted are the format frequencies and bandwidths, as well as the fundamental frequency for the speaker. The format frequencies are illustrated in FIG. 3, in which FIG. 3*a* shows a simplified model of speech production. Thus an initial excitation source 310 outputs either a periodic signal (from the vocal chords), or a noise signal; in very broad terms, the former represents a vowel sound, the latter a consonant (for example in "shoe" the "sh" sound is unvoiced, the "oe" sound is voiced). This is then passed through the vocal tract 320, which modifies the signal from the excitation source 310 to produce the final audio output 330.

Figure 3B:
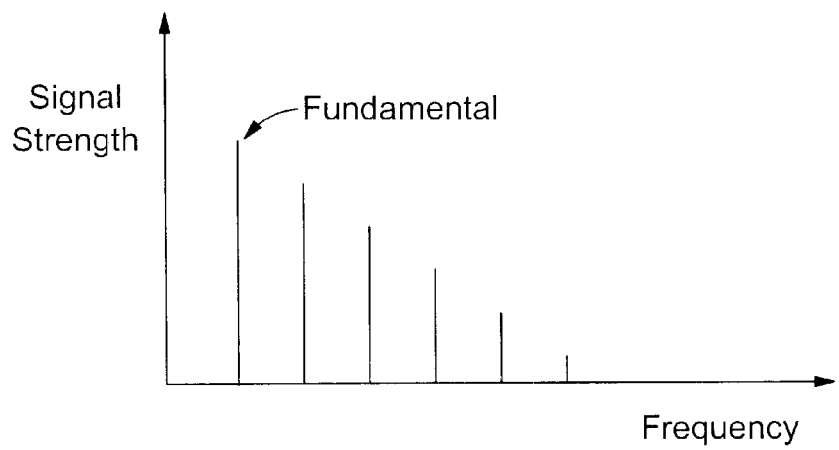

FIG. 3*b* shows the approximate output in the frequency domain of the excitation source for voiced signals (ie using the vocal chords). This can be represented essentially by a periodic signal having a particular fundamental frequency, and a set of harmonics. It is found that the strength of the harmonics has a general decline of about 12 db per octave.

Figure 3C:
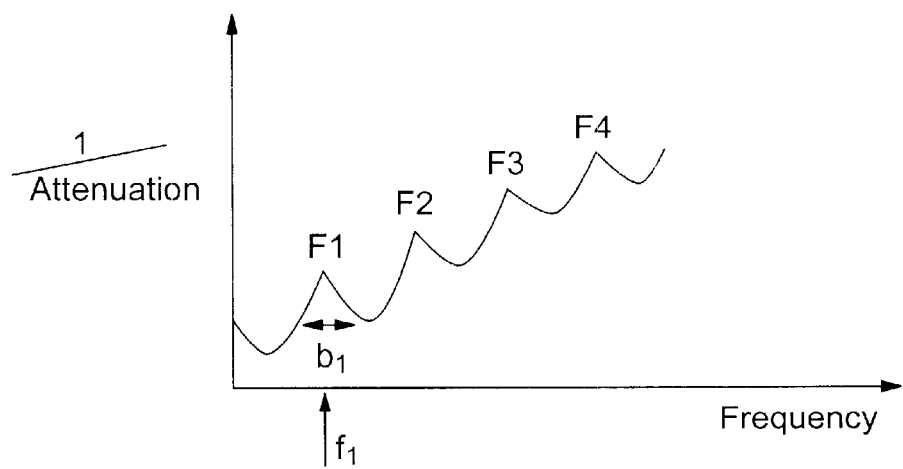
FIG. 3c illustrates the transmission of the vocal tract of FIG. 3a and the position of the format frequencies.

The vocal tract can then be modeled by an appropriate transfer function, which in the frequency domain looks approximately as illustrated in FIG. 3c (note that this diagram includes the effect of both the supralaryngeal tract and also the lips, and so represents the overall transfer function applied to the excitation source in order to produce the audio output). The curve in FIG. 3 represents the inverse of attenuation (ie effectively transmission), shows a general increase of about 6 db per octave, superimposed on which is a series of peaks, referred to as formats. Typically there are four formats (F1, F2, F3, F4), with each format being defined by the central location of its peak, and also some measure of the bandwidth of the peak (FWHM or any other suitable measure); for the format F1, the frequency and bandwidth are indicated in FIG. 3c by the parameters $f_1$ and $b_1$ respectively.

Note that the locations of the formats vary according to the particular sound being made by a speaker, in other words, as the shape of the vocal track is being changed. For any given speaker, the set of format locations essentially determines the sound being expressed, typically which vowel is being spoken. An active area of speech research is therefore to try to understand how we hear the same vowel (eg "a" as in "bat") from different speakers, even although the representations in format space vary. This leads to the concept of normalization, in other words transforming the output from a speaker to some standardized domain (and possibly from a man to a generic woman or vice versa), the desire then being to develop some reliable criteria which permit computational vowel discrimination in a speaker independent fashion. This work is described in "Auditory Vowel Format Variability", PhD Thesis, Pickering, B J, University of Oxford, 1986, and "Vowel Perception and Production" by Rosner and Pickering, Oxford University Press, 1994.

Figure 4:
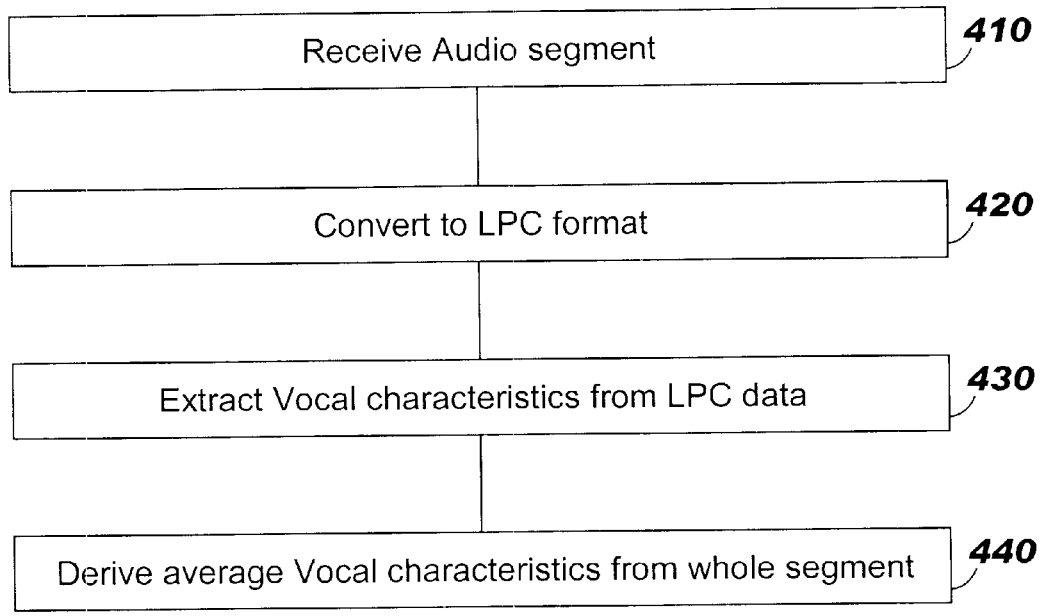
FIG. 4 illustrates in more detail the derivation of vocal characteristics as performed in the method of FIG. 2.

FIG. 4 illustrates the derivation in the preferred embodiment of vocal characteristics from an audio segment, corresponding essentially to the operation shown in FIG. 2 as step 230 (or step 240). Thus the first step depicted in FIG. 4 is to acquire the audio segment (step 410), which is then compressed using linear predictive coding (LPC) (step 420). As previously mentioned, LPC is a very well-known technique for representing an audio signal, according to which each audio sample $y_n$ is modeled as:

$$y_n = \sum_{i=1}^{p}(\alpha_i y_{n-i}) + \varepsilon_n$$

the above expression each audio sample is formed from the combination of an error term $\varepsilon$ and a linear combination of the p preceding audio samples involving corresponding coefficients $\alpha$ (in other words, each sample is predicted on the basis of p previous audio samples, subject to the error term). Following the above approach, the typical error signal derived from speech input, also termed the residual signal, essentially comprises a pulse sequence at the fundamental frequency for voiced sounds, and white noise for unvoiced sounds. LPC coefficients are generally calculated over some 50–100 ms of audio data, and using a value for p in the range of 8–10.

An audio signal can therefore be represented using LPC by the following parameters: set of autocorrelation coefficients $\alpha$; the gain of the signal; an indication of whether or not the audio signal is voiced or unvoiced; and in the former case, the fundamental pitch frequency (these last two are determined from the residual signal). Note that the general decline in harmonic strength shown in FIG. 3b in the excitation source is effectively treated as part of the transfer function of the vocal tract of FIG. 3c, and so results in a net decrease in this curve of about 6 dB per octave. This is then automatically accounted for in the LPC autocorrelation coefficients.

Mathematically, Equation (1) above represents an all-pole filter model for the audio signal. It will be noted that the format distribution in FIG. 3b likewise represents an all-pole filter model for the audio signal. Accordingly, it is relatively straightforward to derive the format central frequencies and bandwidths from the LPC coefficients $\alpha$, as well as the fundamental pitch frequency from the residual signal. This operation corresponds to the extraction of the vocal characteristics from the LPC data depicted in FIG. 4 as step 430. Use of a value of p=8 in the LPC compression leads directly to the determination of four format values (central frequency and width pairings). Note that in an all-pole model the height of a format peak per se is not meaningful, although a format found to have a very broad shape is likely to be spurious and so can be suppressed.

It will be appreciated that LPC is very well-known in the art, and many suitable algorithms developed, often with hardware implementations available. Indeed, some voice processing systems such as the DirectTalk system of the preferred embodiment already use LPC as the basis for their general compressed storage of audio segments, and so already support step 420 of FIG. 4.

Representative LPC techniques are described in: "Fundamentals of Speech Recognition" by Rabiner and Juang, Prentice Hall, 1993; "Fundamentals of Speech Signal Processing" by Saito and Nakata, Academic Press, 1985; "Computer Speech Processing", eds Fallside and Woods, Prentice Hall, 1985 (see in particular the paper by B S Atal), and "Digital Processing of Speech Signals" by Rabiner and Schafer, Prentice Hall 1978. The final three of these references in particular give details of how to extract format information from the LPC data.

Typically the LPC parameters are evaluated for each frame of audio data (eg 20 ms), thereby producing a sequence of LPC data to represent the original audio segment. This is then converted in step 430 of FIG. 4 into a corresponding sequence of vocal parameters, in particular format central frequencies, bandwidths, and fundamental frequency. These values must then be averaged for the whole audio segment (step 440), (or across multiple segments if available), in order to derive parameters which are characteristic overall of the speaker. Note that here, in addition to calculating average values for the parameters listed above, the distributions of the format frequencies are also determined in terms of some appropriate dispersion measure. For example, the standard deviation may be used, although since the distribution of format locations in frequency space is somewhat skewed, some other dispersion measure (mean absolute deviation, quartile points, etc) may offer slightly better results. In a more advanced implementation, the frequency scale may first be transformed into a different coordinate system (eg logarithmic) before such a dispersion measure is calculated. Particularly suitable transformations based on auditory criteria are discussed in the above mentioned references by Pickering, and by Pickering and Rosner.

To summarize therefore, each format is effectively represented by a center value (mean) and a scaling factor (dispersion measure). The latter has been found be an important indicator of the sound of a particular speaker. Thus for a particular sequence of sounds, the shift in format locations from their central (average) values will be typically more exaggerated for those speakers whose speech is brighter and more clearly enunciated.

A somewhat different approach is taken for averaging the format bandwidths. Thus the set of instantaneous bandwidths for any given format is fitted by a surface in format space. This can be understood most easily by considering just two formats, represented by x and y axes, with the z axis then representing the bandwidth of a given format (F1, for example). Thus the instantaneous bandwidths of F1 can then be plotted, and these data points fitted by a suitable surface, using splines or other appropriate techniques, to define a contour in two-dimensional format space. This can then be used to estimate a bandwidth (z value) for any combination of pairs of format values (ie x-y location). The extension of this approach to four format values, in other words into 4+1 dimensions, is mathematically straightforward, if difficult to visualize. This approach is repeated for the bandwidth of each of the four formats.

Figure 5:
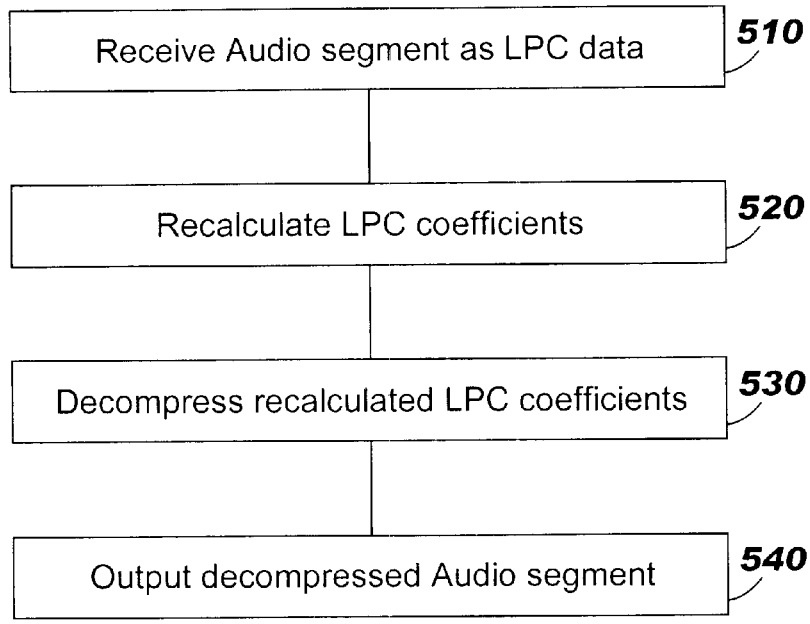
FIG. 5 illustrates in more detail the application of vocal characteristics of a first speaker to an audio segment as spoken by a second speaker, as performed in the method of FIG. 2.

The final stage of the method of the invention is illustrated in FIG. 5, which depicts the operations of taking a set of vocal parameters characteristic of a first speaker, and applying them to an existing audio segment recorded by a second speaker, such that the audio segment now sounds as if spoken by the first speaker (this corresponds to steps 250 and 260 in FIG. 2). Again, it is assumed that the audio segment is initially received in LPC format (step 510), which as previously mentioned is already standard in some voice processing systems such as the DirectTalk system. The task is then to modify the LPC parameters, effectively replacing the vocal characteristics of the second speaker captured therein by the vocal characteristics of the first speaker (step 520).

This second step is accomplished by first extracting the vocal characteristics representing the second speaker which are inherent in the LPC coefficients for the audio segment. Note that in fact two sets of characteristics for the second speaker are used here, namely the instantaneous values for the current LPC frame (corresponding to those derived according to step 430 in FIG. 4), and also the long term averages representative of the second speaker (corresponding to those derived according to step 440 in FIG. 4). The former is typically performed on the fly at output time. The latter may either be available from stored information (whether or not determined from this particular audio segment), or else calculated as an initial step (not shown in FIG. 5) during output of the audio segment.

The approach is then to modify the instantaneous vocal characteristics from those of the second speaker to those appropriate to the first speaker, based on the average vocal characteristics for the first speaker vis-a-vis the average vocal characteristics for the second speaker. In more detail, the application to the audio segment of the vocal characteristics of the first speaker is performed according to the following algorithm (nb the gain and voiced/unvoiced indication are unchanged).

Fundamental frequency: this becomes the original fundamental value as spoken by the first speaker, scaled by the ratio of the mean fundamental frequency of the second speaker to the mean fundamental frequency of the first speaker. Note that the scaling is multiplicative rather than additive, because the ear responds to pitch on an essentially logarithmic scale (as witnessed for example by a piano keyboard).

Format frequency: the new value for each format is determined by first calculating the difference between the instantaneous format frequency and the mean format frequency for the first speaker, multiplying this difference by the ratio of the scaling factor for the second speaker to the scaling factor for the first speaker, and then adding this onto the mean format frequency for the second speaker. Mathematically this can be represented as:

$$f_2 = \overline{f}_2 + \frac{\sigma_2}{\sigma_1}(f_1 - \overline{f}_1)$$

(Here $s_1$ and $s_2$ represent some generalized dispersion measurement for the two relevant formats. Note also that this whole transformation may be performed in an auditory frequency domain, such as mentioned earlier with respect to the calculation of the dispersion measurements).

Format bandwiths: the format bandwidths for the first speaker are essentially thrown away, and replaced by the bandwidths for the second speaker corresponding to the new format frequencies, according to the bandwidth surfaces fitted in step 440 (see above).

Once the above substitutions have been performed, the resulting parameters can be transformed back into LPC format, with the α coefficients being generated from the revised format frequency and bandwidths, and the residual signal being generated from the voiced/unvoiced indication and the fundamental frequency. Mathematically this simply represents the inverse of the operations whereby these parameters were derived from the LPC data in the first place. The system can then decompress the LPC data (step 530), as for any other LPC data set, and finally play out the audio signal corresponding to the decompressed and modified LPC data (step 540).

It will be appreciated of course that steps 520 and 530 are repeated for essentially each frame of LPC data in the audio segment.

Note also that the operation of step 520 needs to be performed only at the LPC frame rate (typically 50 Hz), and since the mathematical operations to extract and then substitute the vocal parameters are relatively straightforward, this operation can be performed in real-time for audio playback using DSP power already residing in a typical voice processing system (for example, as illustrated in FIG. 1).

One minor complication on the above approach is that telephony data is typically transmitted over the network in the form of A law or μ-law data, in other words log-PCM data, sampled at 8 kHz. This sampling imposes a cutoff in frequency at 4 kHz. In addition, the transmission characteristics of the network can result in substantial attenuation of the very lowest frequencies (eg 100 Hz and below), giving an overall passband in the range 100–4000 Hz, although in practice this restriction is often found to be more severe (say 300–3500 kHz). Note that the fundamental frequency for certain male speakers may lie outside (below) this passband. In such circumstances, the fundamental frequency can be reconstructed by looking at the harmonics (typically first, second, third, etc) which do fall within the passband. This harmonic structure can be detected by looking at the power spectrum of the power spectrum of the original signal (this is often referred to as the cepstrum), which leads directly to a determination of the fundamental frequency.

The high frequency cut-off at 4 Khz may exclude the fourth format for some female speakers, but in general this does not seriously impact the application of the present invention. Thus the formats effectively specify only a filter, rather than representing the input signal, and so any format beyond this cut-off is essentially irrelevant (in other words, there is no problem with aliasing, since the formats of themselves do not generate any signal). Conversely, utilizing a fundamental frequency that is below the passband again is acceptable because this merely suffers attenuation in the network (again no problem with aliasing); the fundamental frequency itself is then carried implicitly by harmonics that do fall within the passband.

It will be appreciated that there are many variations on the approach described above. For example, factors such as sampling rate, frame duration, LPC order, number of formats modeled, etc can all be optimized to particular circumstances. In addition, there are many flavors of LPC, and the available coding data will therefore vary with particular implementation. Further the vocal tract information characteristics of a particular speaker may be modeled by parameters other than the format frequencies and bandwidths, although this is likely to significantly increase the mathematical complexity involved.

The techniques described above will be of benefit in a wide variety of voice processing applications. One typical application is in a voice messaging system, where the audio name which is spoken by the subscriber has to be embedded in a system-provided carrier prompt. Thus the audio name can be processed to extract the subscriber voice characteristics, and these can then be applied to the carrier prompt to replace the characteristics of whatever voice was originally used to produce the system prompts. The resulting combination then sounds essentially homogeneous, as if entirely spoken by the relevant subscriber, or at a minimum, the discrepancy between the sound of the audio name and that of the system-provided prompt will be greatly reduced.

(It might be questioned whether an audio name, which typically often represents approximately one second of audio data, provides sufficient basis for extracting the vocal characteristics of the subscriber; in fact, this is found to be generally true. For example, in a somewhat related context, the above reference by Rabiner and Schafer contemplates performing speaker identification based on utterances of typically 2 seconds in length).

To implement the above scheme, the vocal characteristics of the subscriber are extracted when the audio name is recorded, and stored with the audio name in association with the subscriber mailbox. Then, whenever the system utilizes the audio name in a prompt, combined with one or more system-provided audio segments, the relevant vocal characteristics can also be retrieved and applied on the fly to the system-provided audio segments immediately prior to output.

Another illustration of the use of the method of the invention is where an application wishes to use both system-provided audio segments, as recorded by a first speaker, and also application dependent prompts, which have to be specifically recorded by a second speaker. In this situation, the vocal characteristics of the system-provided audio segments can be modified to conform to those of the second speaker. In addition, should the application be subsequently updated, when the second speaker is no longer available, a third speaker can be utilized, and both the system-provided prompts and the original application-dependent prompts processed to sound as if spoken by this third speaker. A final example of employment of the method of the invention is whenever it is generally desired to change the voice characteristics of a set of application prompts. For example, a particular celebrity may be used to advertise a set of products. In these circumstances, it may be desirable for the audio prompts utilized by a voice processing application to handle callers inquiring about or seeking to purchase such products to sound as if spoken by that celebrity. Thus as described above, this can be accomplished by applying the vocal characteristics of the celebrity to the application prompts. Note that this approach would allow the identity of the celebrity to be easily changed; all that would be required would be to determine the vocal characteristics of the new celebrity, there would be no requirement for the new celebrity to re-record all the application prompts.

The functionality described herein can be easily added to conventional voice processing systems, firstly by adding a new command which extracts and stores the vocal characteristics from one or more specified audio segments (ie effectively to perform the method of FIG. 4), and secondly by modifying the standard command for playing out an audio segment to allow such a stored set of vocal characteristics to be applied to the segment. Thus if this field was non-blank, the system would know to modify the audio segment at play-out in accordance with the specified vocal characteristics (ie effectively to perform the method of FIG. 5). Note of course that there is no requirement for the operations of FIGS. 4 and 5 to be carried out on the same machine, or for a single machine to support both methods, since the extraction of vocal characteristics could easily be performed on a first machine, and then transferred to or invoked from a second machine which is responsible for generating the modified audio segment, which might perhaps then be transferred to a third machine for actual playout.

It will be appreciated that although the invention has been described in the context of voice processing systems for use in a telephony environment, there is in fact broader generality, in that the same approach could be taken in any system which uses pre-recorded prompts, for example kiosks, public announcement systems, and so on. A further possibility is that the invention could be employed at the output end of a text to speech (TTS) system in order to customize the output to a desired voice, for use in any environment where text to speech is used, for example, telephony, hand-held devices, toys, etc. Such TTS systems typically derive their voice sound based on the recorded audio segments—typically phonemes or diphones—which are used as building blocks for the audio output. Clearly in these latter circumstances the speaker transformation would have to be performed across multiple audio segments, rather than on a per segment basis.

What is claimed is:

1. Voice processing system for connection to a telephone network and running at least one application for controlling interaction with calls over the telephone network, said system comprising:

means for processing at least one audio segment recorded by a first speaker for use by said at least one application;

means for providing at least one vocal parameter characteristic of a second speaker;

means for applying said at least one vocal parameter to said audio segment to produce a modified audio segment such that said modified audio segment sounds substantially as if spoken by said second speaker; and means for outputting the modified audio segment over the telephone network.

2. Voice processing system of claim 1 further comprising means for providing at least one vocal parameter characteristic of the first speaker.

3. The system of claim 2, wherein said at least one vocal parameter characteristic of the first and second speaker comprises for each respective speaker the average value of the frequency of at least two formats.

4. The system of claim 3, wherein said at least one vocal parameter characteristic of the first and second speakers further comprises for each respective speaker a measure of the degree of distribution of at least two format frequencies about their respective average values.

5. The system of claim 4, wherein the modified audio segment is produced by altering an instantaneous frequency of said at least two formats from an original value to a new value, such that the displacement of the new value from the average value of the format frequency as spoken by the second speaker is equal to the displacement of the original value from the average value of the format frequency as spoken by the first speaker, scaled by the ratio of the respective dispersions of the format frequency about its average value for said first and second speakers.

6. The system of claim 2, wherein said at least one vocal parameter characteristic of the first and second speaker comprises for each respective speaker the variation of the format bandwidth with format frequency.

7. The system of claim 6, wherein the modified audio segment is produced by replacing an original value of instantaneous bandwidth of at least two formats with a new value that is dependent on the variation of format bandwidth with format frequency for the second speaker.

8. The system of claim 2, wherein said at least one vocal parameter of the first and second speakers comprises for each respective speaker the average value of the fundamental frequency.

9. The system of claim 8, wherein the modified audio segment is produced by altering an instantaneous fundamental frequency from an original value, such that the displacement of the new value from the average value of said fundamental frequency as spoken by the second speaker is equal to the displacement of the original value from the average value of said fundamental frequency as spoken by the first speaker, scaled by the ration of the respective average fundamental frequencies for said first and second speakers.

10. The system of claim 2, wherein the modified audio segment is produced by altering at least one instantaneous vocal parameter of the segment, dependent on an average value of said vocal parameter for the second speaker relative to an average value of said vocal parameter for the first speaker.

11. The system of claim 1, further comprising means for compressing an audio segment and means for decompressing an audio segment using linear predictive coding, and wherein said at least one vocal parameter is applied to an audio segment by modifying the LPC parameters for the audio segment.

12. A method for modifying audio output from a voice processing system running at least one application for controlling interaction with calls over a telephone network, said method comprising:

providing at least one audio segment recorded by a first speaker for use by said at least one application and at least one vocal parameter characteristic of a second speaker;

applying said at least one vocal parameter to said audio segment to produce a modified audio segment such that said modified audio segment sounds substantially as if spoken by said second speaker; and outputting the modified audio segment over the telephone network.

13. The method of claim 12, wherein said audio output comprises two or more segments, including at least one recorded by the first speaker and at least one recorded by the second speaker, wherein each audio segment recorded by the first speaker is modified such that the audio output sounds substantially as if all spoken by said second computer.

14. The method of claim 12, wherein an application uses multiple audio segments, and wherein each of said multiple audio segments is modified such that the audio output sounds substantially as if all segments are spoken by said second speaker.

15. The method of claim 12, wherein said at least one vocal parameter comprises information regarding the excitation source and filter function for that speaker, and said step of applying said at least one vocal parameter of said an audio segment to produce a modified audio segment such that said modified audio segment sounds substantially as if spoken by said second speaker comprises replacing the excitation source and filter function of the first speaker by the excitation source and filter function of the second speaker.

16. Apparatus for running an application which plays out audio segments, said apparatus comprising:

means for providing a set of audio segments recorded by a first speaker for use by said application;

means for providing at least one vocal parameter characteristic of a second speaker;

means for applying said at least one vocal parameter to said set of audio segments to produce a modified set of audio segments such that said modified set of audio segments sounds substantially as if spoken by said second speaker; and means for outputting the set of modified audio segments;

wherein said at least one vocal parameter comprises information regarding the excitation source and filter function for that speaker, and said means for applying said at least one vocal parameter to said an audio segment to produce a modified audio segment such that said modified audio segment sounds substantially as if spoken by said second speaker comprises means for replacing the excitation source and filter function of the first speaker by the excitation source and filter function of the second speaker.

* * * * *